US 011023461B2

(12) United States Patent
Rumiantsau et al.

(10) Patent No.: US 11,023,461 B2
(45) Date of Patent: Jun. 1, 2021

(54) QUERY TRANSLATION

(71) Applicant: ServiceNow, Inc., Santa Clara, CA (US)

(72) Inventors: Mikhail Rumiantsau, Menlo Park, CA (US); Alyaksandr Zaytsav, Santa Clara, CA (US); Alexey Zenovich, Santa Clara, CA (US); Aliaksei Vertsel, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 185 days.

(21) Appl. No.: 16/249,725

(22) Filed: Jan. 16, 2019

(65) Prior Publication Data

US 2019/0243831 A1    Aug. 8, 2019

Related U.S. Application Data

(60) Provisional application No. 62/619,654, filed on Jan. 19, 2018.

(51) Int. Cl.
*G06F 40/14*  (2020.01)
*G06F 16/2452*  (2019.01)
*G06F 16/22*  (2019.01)
*G06F 40/30*  (2020.01)
*G06F 40/253*  (2020.01)
*G10L 15/26*  (2006.01)

(52) U.S. Cl.
CPC .... *G06F 16/24522* (2019.01); *G06F 16/2246* (2019.01); *G06F 40/253* (2020.01); *G06F 40/30* (2020.01); *G10L 15/26* (2013.01)

(58) Field of Classification Search
CPC .......... G06F 40/14; G06F 40/00; G06F 40/10; G06F 40/12; G06F 40/137; G06F 40/151; G06F 40/154; G06F 40/20; G06F 40/226; G06F 40/253; G06F 40/279; G06F 40/295; G06F 40/30; G06F 40/40; G06F 40/51; G06F 40/55; G06F 17/30401; G06F 17/30418; G06F 17/30427; G06F 17/3043; G06F 17/30439
USPC .................................. 704/9, 1, 2, 4, 10, 257
See application file for complete search history.

(56) References Cited

U.S. PATENT DOCUMENTS 6,321,229 B1   11/2001   Goldman
6,609,122 B1   8/2003    Ensor
(Continued)

FOREIGN PATENT DOCUMENTS

WO    20130115985 A2    8/2013

OTHER PUBLICATIONS

Extended European Search Report for European Patent Application No. 19152645.8 dated Mar. 27, 2019; 9 pgs.

*Primary Examiner* — Qi Han
(74) *Attorney, Agent, or Firm* — Fletcher Yoder PC

(57) ABSTRACT

Translating a natural language search query into a query language includes receiving a natural language query for a database, processing the natural language query to generate a modified text input, generating an entity tree based on the modified text input, including assigning one or more semantic markers to one or more words or one or more groups of words within the modified text input, wherein each semantic tag denotes a semantic class for each respective word or group or words, and converting the entity tree into the query language associated with the first database.

17 Claims, 10 Drawing Sheets

(56) References Cited

U.S. PATENT DOCUMENTS

| | | |
|---|---|---|
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,493,400 B2 | 2/2009 | Loaiza et al. |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,983,982 B2 | 3/2015 | Rangarajan |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2016/0012105 A1* | 1/2016 | Chang .................. G06F 16/243 707/706 |
| 2017/0025120 A1* | 1/2017 | Dayan ................ G06F 16/3335 |
| 2017/0075953 A1 | 3/2017 | Bozkaya et al. |
| 2017/0083569 A1 | 3/2017 | Boguraev et al. |
| 2017/0372231 A1* | 12/2017 | Ghatage .................. G06F 40/58 |

\* cited by examiner

QUERY TRANSLATION

CROSS REFERENCE TO RELATED APPLICATIONS

This application claims priority from and the benefit of U.S. Provisional Application No. 62/619,654, entitled "QUERY TRANSLATION," filed Jan. 19, 2018, which is incorporated by reference herein in its entirety for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

As work across all industries becomes increasingly data driven, the ability to quickly access and interpret data has become more important than ever. Information retrieval technologies are being utilized by organizations and companies to manage their information systems and processes. Despite information retrieval of a large amount of data being efficiently organized in relational databases, a user still needs to master the DB language/schema to completely formulate the queries. This puts a burden on organizations and companies to hire employees that are proficient in DB languages/schemas to formulate queries. To reduce some of the burden on already overstretched data teams, many organizations are looking for tools that allow non-developers to query their databases.

Unfortunately, writing a valid SQL query that answers the question a user is trying to ask isn't always easy. Even seemingly simple questions, like "Which start-up companies received more than $200M in funding?" can actually be very hard to answer, let alone convert into a SQL query. How do you define start-up companies? By size, location, duration of time they have been incorporated?

As more and more organizations try to integrate data into their decision-making processes, the ability for non-data specialists to write their own queries can be the key to major gains in productivity and improved decision making. Especially as functions that have traditionally been less data-driven, like Marketing and HR, begin to explore their own data, it's important for employees to be able to get answers to their questions in a timely manner.

A few years ago, the major bottleneck in data science was cleaning and processing huge volumes of data so that it could be analyzed. While new tools and processes have automated large parts of the data ingestion process, a new bottleneck has appeared: The analysis itself. Even though data science remains one of the fastest growing jobs categories in the country there still simply aren't enough trained data analysts to answer all the questions that organizations are creating.

As work across all industries becomes increasingly data driven, the ability to quickly access and interpret data has become more important than ever. To reduce some of the burden on already overstretched data teams, many organizations are looking for tools that allow non-developers to query their relational databases.

There are plenty of business intelligence (BI) tools out there that provide dashboards with key metrics, but if you're only looking at dashboards you're missing out on all the insights that remain hidden inside your data. That's why it's important to be able to perform ad-hoc queries as well.

These tools work by connecting to a database and then allowing users to select what variables they want and then map them onto a graph or chart. Unfortunately, these tools have a number of shortcomings. A visual query builder may generate technically valid SQL, but the query itself may end up being too complex to run or risk bringing your server down in the process.

Another shortcoming of visual query builders is that they still require users to know more or less what they're asking for. To construct a query, you still have to manually select the right columns and input the appropriate conditions. In essence, the user still has to "convert" their question into terms a computer can understand even if they're not writing the exact query.

This may be fine if a user is working with a database they're already familiar with, but what if users are not familiar with the database. What is needed is a centralized system that can effectively translate natural language queries into specific database queries for different customer database types.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
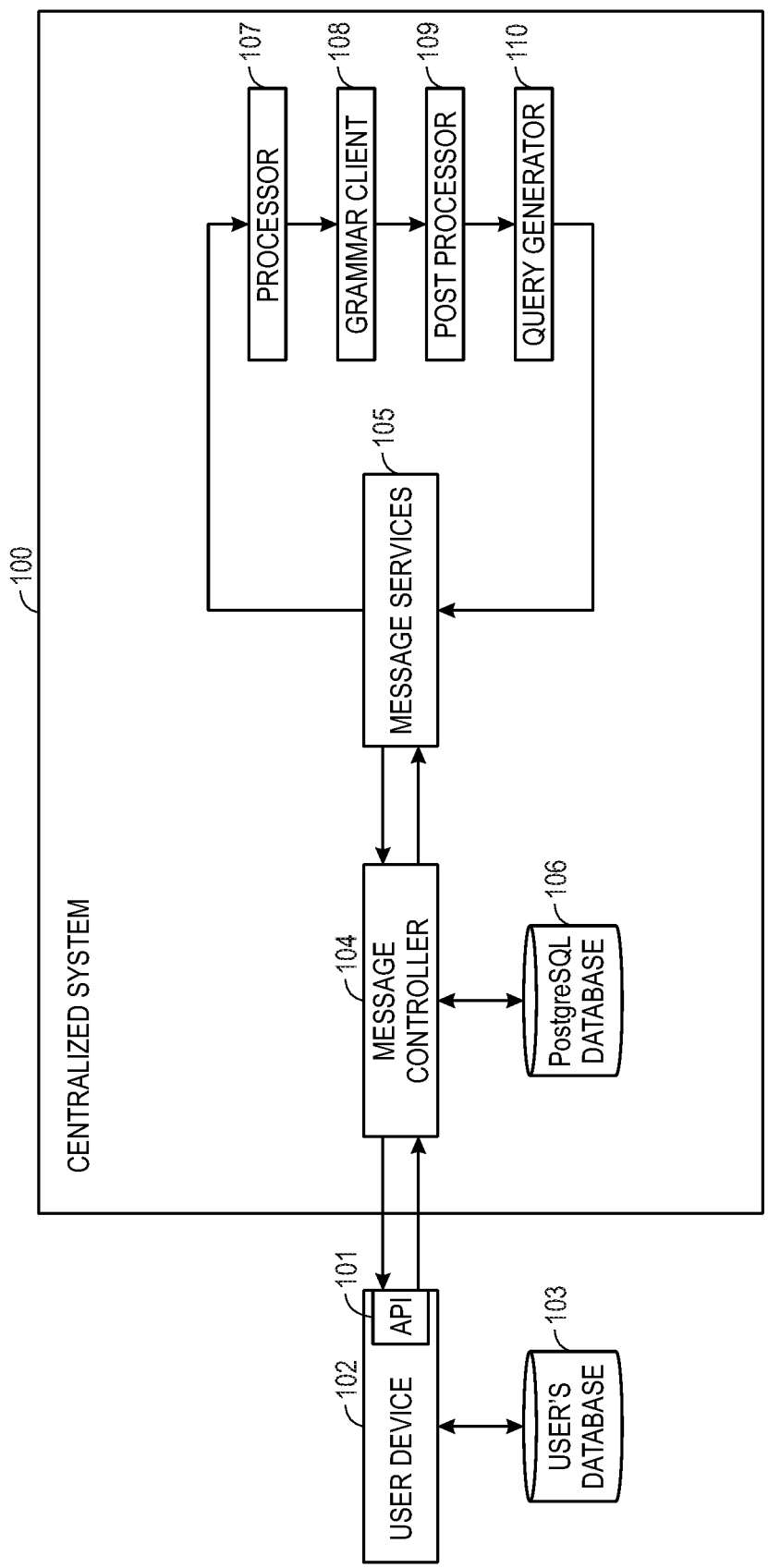
FIG. 1 depicts a block diagram illustrating a centralized system used to translate a natural language query into a database specific structure, in one embodiment.

FIG. 1 depicts a block diagram illustrating a centralized system used to translate a natural language query into a database specific structured query. In this embodiment, the centralized system does not have permission to access the customer's database.

A centralized system 100 receives a plain text message or voice message comprising a natural language query from a user device 102, and translates the received natural language query into a query having a specific structure that is associated with the user's database 103.

The user device 102 includes an API 100 which is used to communicate with the centralized system 100. Though the user device shown in FIG. 1 includes the API 100, the user device may interface with the centralized system via a web browser, an application, or some other user interface, in addition to or in place of the API 100. The user device 102 transmits a plain text message comprising a natural language query to the centralize system 100 so that the centralized system 100 can translate the natural language query into a format that is compatible with the database 103 associated with the user device 102. Once the centralized system 100 generates and transmits the translated query to the user device 102, the user device 102 can run the translated query against the user device's database 103.

The centralized system 100 includes a message controller component 104, a message service component 105, a pre-processor library 107, a grammar client library 108, a post-processor component 109, and a query generator component 110. The message controller component 104 is configured to receive the plain text messages transmitted by the user device 102 and to search the centralized system database 106 to find a record associated with the user. If a record associated with the user is found, then the message controller component 104 generates an object associated with the user and transmits the generated object along with the received plain text message to the message service 105. The message service 105 initiates processing and analyzing of the plain text message by passing the plain text message to the pre-processor library 107, then to the grammar client library 108 and to the post-processor component 109 (the functions described in greater detail below in FIG. 4). The processed/analyzed plain text data is then passed to the query generator 110, so that the query generator 110 can generate a translated query in a language that is of the type of the user's database 103.

Figure 2:
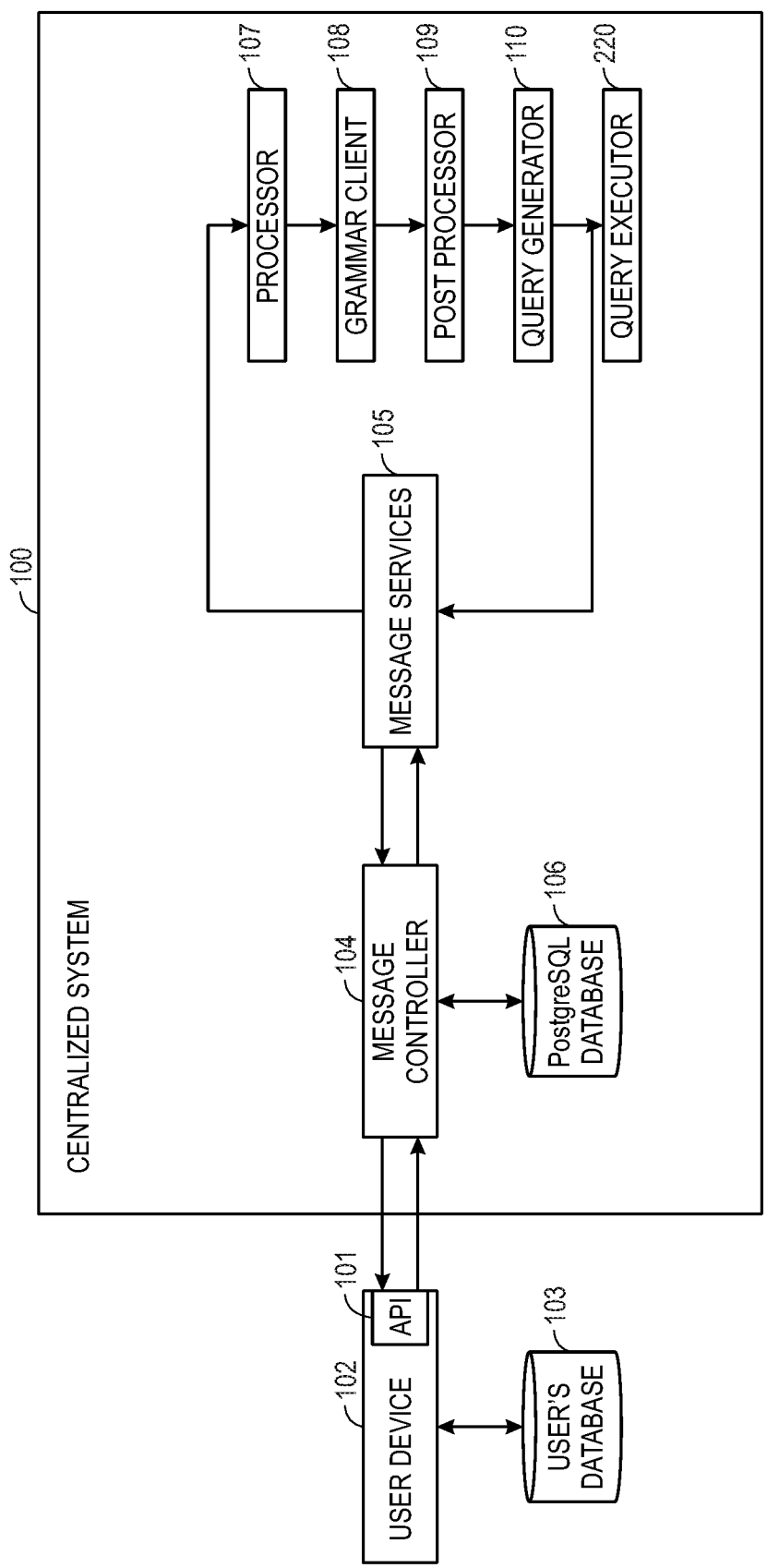
FIG. 2 depicts a block diagram illustrating a centralized system used to translate a natural language query into a database specific structure, in one embodiment.

In this embodiment, the centralized system 100 returns the translated query to the user device 102 and the user device 102 initiates the translated query against the user's own database 103. In another embodiment, as depicted in FIG. 2, the centralized system 100 has permission to access the user's database 103. In this embodiment, when the query generator 110 generates the translated query that is of the type of the user's database 103, the query executor 220 can access the user's database 103 directly and can run the translated query. The query executor 220 retrieves the results of the translated query and the results of the translated query are returned to the user device 102. In this embodiment, from the user's point of view, the user merely enters a query request in natural language and is returned query results from the user's own database 103.

Figure 3:
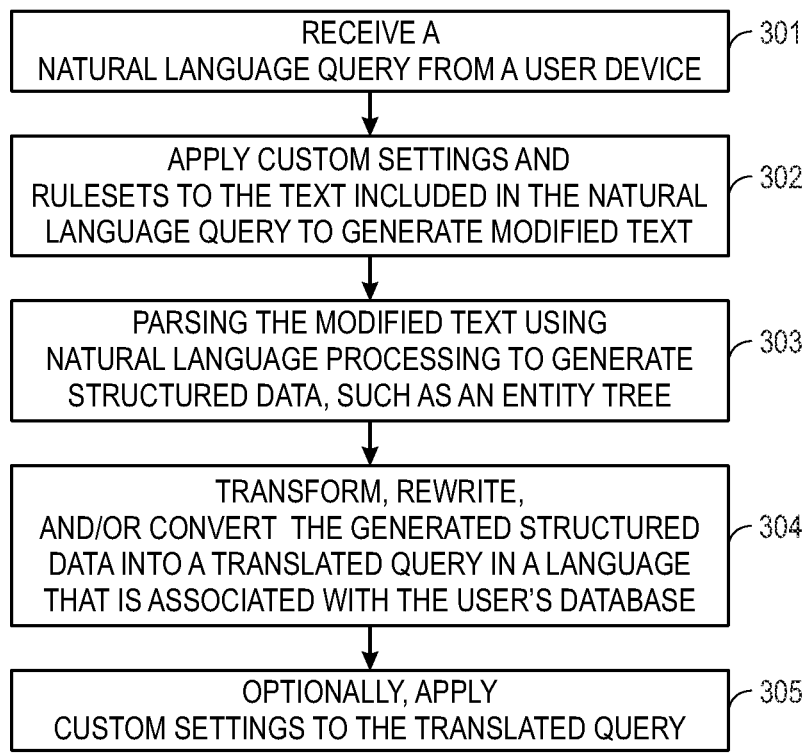
FIG. 3 depicts an operational flow diagram illustrating a high level overview of a method for translating a natural language query into a database specific structure, in one embodiment.

FIG. 3 depicts an operational flow diagram illustrating a high level overview of a method 300 for translating a natural language query into a database specific structured query.

At step 301, a system receives a natural language query from a user. The natural language query may be in the form of plain text or may be a voice message.

When the system receives a voice message, the system converts voice message into a text message. For example, when the system receives the voice message, it samples, or digitizes, the sound by taking precise measurements of the wave at frequent intervals. The system filters the digitized sound to remove unwanted noise, and sometimes to separate it into different bands of frequency (frequency is the wavelength of the sound waves, heard by humans as differences in pitch). It also normalizes the sound, or adjusts it to a constant volume level. It may also have to be temporally aligned. Additionally, the sound must be adjusted to match the speed of the template sound samples already stored in the system's memory. Next, the signal is divided into small segments as short as a few hundredths of a second, or even thousandths in the case of plosive consonant sounds—consonant stops produced by obstructing airflow in the vocal tract—like "p" or "t." The program then matches these segments to known phonemes in the appropriate language. A phoneme is the smallest element of a language—a representation of the sounds we make and put together to form meaningful expressions. The system examines phonemes in the context of the other phonemes around them. It runs the contextual phoneme plot through a complex statistical model and compares them to a large library of known words, phrases and sentences. The program then determines what the user was probably saying and either outputs it as text.

Once the system has converted the voice message or has received the plain text from the user, in step 302, the system applies custom settings and rulesets to the text to enrich the text and provide for broader search criteria which will be used to generate the translated query. For example, spelling dictionaries and rulesets may be used to generate a set of text that will be used to generate the translated query. Spelling dictionaries may be used to correct spelling. Grammatic and contextual rulesets may be used extract irrelevant text and add relevant text, such as synonyms, and provide disambiguating information.

In step 303, the modified text from step 302 is parsed using natural language processing to generate structured data, such as an entity tree. The generated structured data includes all required information to generate a valid database query. For example, the modified text may be rewritten based on rules, wherein each term in the modified text is paired with a structured element. For example, an initial query received from a user includes the following text: "please show profitable start-up from Boston that raised more than 200M." The text, after modification (i.e. extracting irrelevant text and correcting spelling/grammar) would result in: "start-up Boston raise more than 200M." This modified text would be parsed such that each term in the text would be replaced or matched with a structured element. For example, the term "start-up" would be matched with a column in a table labeled companies, wherein each company listed in the column has an indication of whether the company is a start-up or not.

In one embodiment, the modified text from step 302 is processed in 4 main parts: semantic tagging, syntactical parser, semantic analyzer and entity tree builder.

The semantic tagger features the following functions which makes it different from most traditional NLP systems. Rather than marking up the input chain of words with Part-of-Speech tags, the tagger disclosed here assigns semantic markers to words which denote their potential role in the query: entity, entity attribute, attribute class string/ number/date/etc.), or functional word. The tagger doesn't make the ultimate decision about the word semantic class but rather creates a list of possible semantic functions of each word. The tagger is not limited to tagging single words only but can also tag chains of words assigning specific tags for the first, second etc. words of the chain. The rules for assigning semantic tags are compiled on the fly which allows to translate queries to databases with a dynamic schema, e.g. when the schema is not preset in the system configuration and API receives the schema along with the query. The tag set can be extended without changing the architecture or code of the core system. The tagger allows for multiple versions of tagging thereby creating alternative versions of syntactical analysis by the parser.

The syntactical parser is based on a set of grammatical rules describing all possible input word chains. The parser uses the hypotheses about semantic classes of words and word groups provided by the tagger and identifies which semantic functions fit into the grammar. The parser allows to set up multiple hypotheses about each structural element as well as control the priority of the hypotheses. Rather than identifying the traditional grammatical structures, the parser analyzes the input sentence in terms of query elements such as field list, grouping/sorting clauses, conditional operations, etc. Such an approach allows to encompass both grammatically correct sentences written in a natural language, semi-structured queries (Google-like queries) and queries where natural language is mixed with math formulas or fragments of a formal language such as SQL. The parser can use multiple alternative versions of semantic tagger thus organizing the syntactic processing as a set of cascading grammars which range from more strict to less strict.

The semantic analyzer uses the knowledge about the syntactical structure of input query to create a formal object that can be further translated to a structured query. The current version of the semantic analyzer is implemented using XSLT/XPath stack. The semantic analyzer validates the query assuring that it makes sense in terms of the database being queried. The semantic analyzer allows to process queries where the target field to be used as the filter is unknown and only the value to be search for is specified (so called generic query).

In case of multi-dimensional datasets (e.g. relational databases comprising multiple connected tables), the entity tree builder identifies the relations between entities in the object output by the semantic analyzer. The entity tree builder uses a combination of heuristic rules and knowledge about the relations between entities and their attributes provided as a part of dataset configuration.

In step 304, the generated data structure, such as the entity tree, is transformed, rewritten, and/or converted into a translated query in a language that is associated with the user's database. This allows for the centralized system to be independent on any specific database engine, and the system is allowed to generate database specific database queries for a variety of database engines. In the example discussed above, the structured elements are used to generate the following SQL statement to be used to query a database: "Select* From companies; WHERE 'boston'=ANY (LOWER(city::text)::text[ ]); AND raised >'200000000'LIMIT 100;".

In one embodiment, the entity tree is an abstract model that can be used to describe queries to datasets stored in different formats and paradigms including relational, document, CSV or domain specific. The query generator is implemented as a set of template rules according to the principles of the queried database. There can be multiple implementations of the query generator including standard preset ones (e.g. for various known dialects of SQL) and custom ones built for proprietary query formats of specific clients.

In step 305, optionally, custom setting may be applied to the SQL statement in order to fetch exactly what the user intended to retrieve from the database. Custom settings may be typical values used by a user. For example, values or information that a user typically enters for a specific database can be modified to create typing shortcuts. For example, a company a user is employed at may employ a database which stores information relating to the location of potential clients. Typically, a user may enter a location value for the query, such as New York or San Francisco. The custom settings may be used to allow the user to enter abbreviations of the location value, instead of the full word, such as NY or SF.

The custom settings may set by an administrator or may be adapted to using machine learning. For example, if a number of users to a specific database enter "NY" and receive an error message, and then enter "New York", the computer may be able to associate NY as being an abbreviation of New York.

Figure 4:
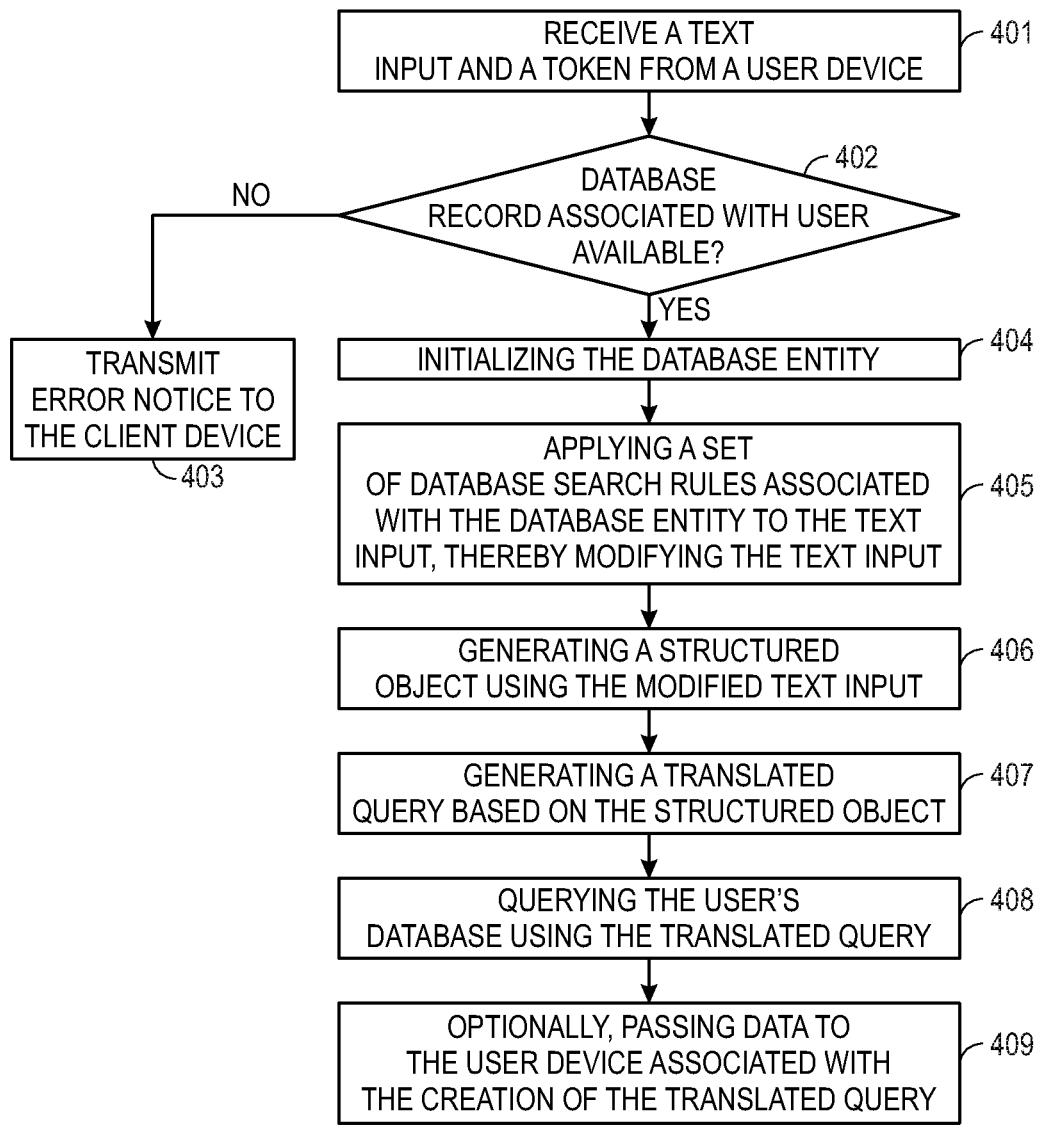
FIG. 4 depicts an operational flow diagram illustrating a low level overview of a method for translating a natural language query into a database specific structure, in one embodiment.

FIG. 4 depicts an operational flow diagram illustrating a lower level overview of a method 100 for translating a natural language query into a database specific structure.

In step 401, a centralized system receives an API token and a text message or a voice message from a user device. The voice message may be translated to plain text by the user device before being transmitted to the centralized system, or the voice message may be transmitted to the centralized system, wherein the centralized system then translates the received voice message to plain text.

The user device may be connected to the centralized system via an application programming interface (API) initiated on the user's device, wherein the user may send the text/voice message to the centralized system. In some embodiments, this above-described one-to-one aspect of the communication between the centralized system and respective users is imposed using API keys and tokens, where the API key identifies a particular centralized system resource, such as a database record stored in a database associated with the centralized system. The API token indicates the identity of message or content. For instance, in such embodiments, when the user wishes to communicate with the centralized system, a message request is made, which includes the text/voice message or content. The message request further includes the API key thereby identifying the database associated with the centralized system and an API Token, which identifies the originator of the content or message, the user. In some such embodiments, the API token not only serves to identify the originator of the content, it also serves to designate access privileges associated with the originator of the content or message. The user identifier (i.e. the API Token) may be used by the centralized server to identify the user's record in the database associated with the centralized system.

In step 402, when the centralized system receives the transmitted message and the API token, a message controller component associated with the centralized system will query, using the API token, the database associated with the centralized system to find a database entity record associated with the user. The database associated with the centralized server, such as a PostgreSQL database, stores database entity records for all its users. Each record includes information associated a different user, such as user ID and user's database type. The user's database type includes information regarding the type of database query language that the received text message should be translated to.

In step 403, if the query of the database associated with the centralized system does not provide any results of a database entity record that is associated with the user, then an error message will be transmitted to a user. In one embodiment, the message controller component will send instructions to the message service component to transmit an error message to the user.

In step 404, if the query of the database associated with the centralized system does locate a database entity record associated with the user, then the message controller component will initialize a database entity object and will pass the database entity object with the text message to the message service component associated it the centralized system.

The Database Entity is a presentation of a user's database in our system. It stores credentials, such as username, password, host, port, so that the system will be able to connect to the database. The database entity may also store information about database engine (MySQL, PostgreSQL, MS SQL and so on) running on the user's database.

The database entity also is associated with or connected to the 'columns' and 'tables' objects which store required information about databases' structure columns and tables.

The Database Entity is created when setting up the user's database system with the query translator system.

In step 405, the message service component may modify the terms within the text message.

To modify the text message, the message service component may parse the text message and then apply a ruleset to the terms used within the text message. For example, the message service component will apply database specific rules to the terms in the text message. This may include correcting spelling errors, and utilizing extraction methods for ambiguous terms within the text message. Additionally, the message service component will identify terms that are associated with structural elements of the database. For example, if the term "startup" was included in the text message, this term would be associated with the structural element "companies", wherein the database includes a "companies" table.

The message service component may also call a pre-processor library to perform common rules to normalize terms within the text message when needed. For example, number within the text message may be normalized, such as the term "1M" within the text message will be normalized to 1,000,000.

The message service component may also call the grammar client library. The grammar client library will be used for a deep grammatical analysis of the text message. This may include identifying relevant words or key words from the text message, and generating categorization of terms.

In one embodiment, each word of the input query can be assigned multiple categories, and the final decision about the actual word category is made at the grammatical analysis stage. The grammar rules use context to resolve category ambiguity. For example, word "where" has conjunction category by default but can also be used as a column name in a DB table. Thus in the input query "show companies with where=New York", category of the word "where" will be resolved as column name. And in the query "show companies where investment is more then 1B", the word "where" is treated as a conjunction. Categories can be also assigned not only to single words but also to word chains. This allows to process data columns consisting of multiple words, e.g. "first name". In this case, the first and the subsequent words of the chain are assigned special position-in-chain categories that are then used by the grammar rules to recognize the input query structure.

The grammar client library may also be used to determine synonyms for the terms used within the text message and/or the key words.

In step 406, the modified database entity object and the terms within the text message are passed to a post processor library to generate a structured object, such as an entity tree. The modified database entity object and the terms within the text message include all required information to generate a valid database query, such as a SQL query. The post processor library will normalize the object which represents a parsed query. For example, the database entity object will be normalized. To normalize the database entity object, the post processor library will be used to remove redundant conditions, map terms within the text message and their synonyms to columns of information within the database. Additionally, the post process library will be used to provide several minor structural changes to the database entity object.

In one embodiment, the user may also edit or modify the database entity. To modify the database entity, the system includes a separate HTTP PUT endpoint. It can modify such parameters, such as username, password, host, port, engine_type, and the like. Also there are endpoints to manage database schema: add, delete, update tables' and columns' information.

In step 407, the structured object is passed to a database connector, such as a DB Connector. The database connector is an encrypted service that acts as a gateway between the centralized system and the user's database. The database connector will consistently call a query generator object. The query generator object will generate a specific database query in a type that is associated with the user's database, such as an SQL query.

In step 408, the database connector will call a query executor that will run the generated specific database query against the user's database. In one embodiment, if the user provides the centralized system access to the user's database, the query executor will run the generated specific database query against the user's database. If the user does not provide the centralized system a read access, then the query executor will provide a message service component the generated specific database query, so that the generated specific database query can be transmitted to the user.

In step 409, optionally, the database connector will pass data to the message service component. For example, if the system has access to the user's database, then the system will be able to fetch data from their database and respond with it alongside with generated SQL query. If the system does not have access to the user's database, then the system will simply respond with only with SQL query.

The message service component will create a record in the centralized system. The record includes every previous step of message analyzing. Additionally, the data may also be sent to the message controller component, wherein the message controller component will generate a JSON (or XML, according to the user's need) from the data and will respond to the user.

A natural language processing model, described in steps 404-406, may incorporate machine learning techniques, or component thereof, to help generate a more accurate database query. For example, a natural language processing model may receive the text message that includes a query in natural language, and may make predictions about the text to help determine what the user is requesting and what information or actions might be relevant responses to the query.

Natural language processing models may be trained using training examples from well-behaved domains. For example, documents that have been human-annotated with part-of-speech tagging may be training examples used to train a natural language processing model. When a natural language processing model that has been trained on training examples from a well-behaved domain is given input such as search queries and potential search results, which may be, for example, documents, the results may be much worse than when the natural language processing model is given input similar to the training examples.

The natural language search queries may be short, grammatically unsound, and lacking in context. The natural language processing model may have difficulty identifying the part-of-speech of words in a search query, including disambiguating syntactically confusable labels, and determining the syntactic structure of the query. This may reduce the usefulness of natural language processing models in interpreting documents and responding to search queries. There may be few training examples available with which to train the natural language processing model to interpret search queries.

Therefore, to effectively use machine learning techniques in the natural language processing models, the present invention incorporates machine learning in all the layers of the natural processing, steps 402-406. This includes, machine learning techniques to be used from information extraction and data mining all the way through crunching user activity logs and the internal logs of the behavior of the core technology in response to user actions, through the realm of Markov chains and finite state machines, down to the aspects of machine learning which are commonly referred to these days as artificial intelligence (employing the techniques to automatically uncover the insights that lead to better user facing features, as opposed to simply using the machine to complement humans). Specifically, machine learning may be applied to:

The initial query message preprocessing and transformation;

Matching the query with the related grammar(s), both in strict and fuzzy sense of the word;

Presenting the output to the user;

Adding interactivity to the output; the functionality is, but not limited to, spelling corrections, query rewrite suggestions, and other textual and non-textual forms of UX to assist the user; and Continuous ranking of results, both of query suggestions and of the data records that have been retrieved from the underlying data storage, leveraging the user feedback in real time in order to provide more relevant results first.

Example of API Features Used to Translate Natural Language Query Submitted by a User An API implemented on user device allows a user to communicate with a centralized system. The user may want to query a database associated with the user's device for Boston companies that raised more than $200 million dollars. To that end, the user, via the API, enters the following text message: "Show companies from Boston raised more than 200M."

The text message is transmitted by the API to the centralized system so that the centralized system can translate the natural language query into a query language that the database associated with the user's device can utilize. The API, prior to transmitting the text message, attaches a API token to the header of the transmittal.

When the centralized system receives the text message and the API token, the centralized system parses the transmittal to identify the API token and uses the API token to identify a record associated with the user stored on the centralized system database. Using the information within the identified record, the centralized system can query the database to information that is associated with the user's database system, which will be used to translate the query into a language specific to the user's database schema. If the centralized system does not have access to the user's database, the centralized system will return the translated query to the user. If the centralized system has access to the user's database, the centralized system will query the user's database using the translated query. For example, the centralized query may have translated the user's natural language query (i.e. "Show companies from Boston raised more than 200M") into a SQL query. The SQL query may be used to query the user's database. The user's database will return the following the following JSON object.

```
data:
[
{
name: "Catalant",
city: "{Boston,Massachusetts,"United States"}",
status: "Operating",
founded_year: "2012",
markets: "{"Professional Services",Consulting,"Enterprise Software"}",
employees: "100",
raised: "34550000"
},
{
....
}
]
```

In some embodiments, the API allows for parsing object requests. An object request maybe requested by the centralized system to determine the database schema associated with the user's device. For example, an object may be requested to reveal the database schema associated with the user's database. For example, the parse object request may include parameters such as a unique token associated with the user that has been generated after signing up with the centralized system, the message to be processed, and a database scheme hash which represents a database structure. For example, the hash may read as {companies: [ {raised: 'Name', type: 'integer'}, . . . ], organizations: [ . . . ] }. Other parameters may include a database_schema_guide parameter which is a uniqe token that represents each database in associated with the centralized system, a database_schema_updated_at parameter that includes a time since the database was last updated (a new "database_schema" wouldn't applied and/or used if new "database_schema_updated_at" indicates that the database schema was recently updated. Including parameters such as database_schema_guid and database_schema_updated_at will make parsing faster.

In response to the parse object request, data in a JSON format may be returned. For example, {"sql_command": "SELECT*FROM companies WHERE 'boston'=ANY (LOWER(city::text)::text[]) AND raised>'200000000' LIMIT 100;" } would be returned in response to the parse object quest.

In some embodiments, the API allows for autocomplete requests. While a user enter in natural language queries, the centralized system may generate code the can be used to provide a plurality of autosuggested values. For example, an autocomplete request would include the following parameters: a database unique token that has been generated when the user signed up with the centralized system, and a query message which will be used for generation of the autosuggestions.

In response to the autocomplete request, the centralized system may provide an autocomplete response. For example, if a user type "companies" as part of a query, then an autocomplete response may be an array with several elements which contains autosuggested values: data: ['show companies', 'show 5 companies', 'show company which name is Google', 'show startups', 'show 5 startups'].

In some embodiments, the centralized system issues a get schema request. The get schema request is a dynamic database request to check if the schema associated with the user's database is the same as what is being used by the centralized system. The get schema request generates a request using a schema token parameter that includes a database unique token that represents corresponding a database entity object in the centralize system.

In response to the get schema request, a get schema response is generated. The get schema response provides guidelines on what to change the database entity to. For example, a get schema response is represented as a hash which represents a database entity object and all its column:

```
{
  "name": "FriendlyDataDemoDB",
  "guid": "b00759de-1513468-4f23490-9223480-eab2344fbbc765e",
  "engine_type": "pg",
  "tables": [
    {
      "table_name": "companies",
      "columns": [
        {
          "name": "name",
          "type": "text",
          "guid": "06e19c3fd68dfh6-44a6dfh-8avb99
            dfhabdf3620bb8",
          "top_values": [ ]
        },
        ...
      ]
    }
    ...
  ]
}
```

In one embodiment, through the API, a new dynamic database entity object can be created without extra input from the user by issuing a post schema request. The post schema request includes the following parameters: user token that represents information associated with the user and provided to the user at the time the user signs up with the centralized system, and a database schema parameter which is a hash that represents a database structure. For example, the hash may include:

```
{
  "database_schema": [
    {
      "table_name": "leads",
      "columns":
        [
          {"name": "id", "type": "integer"},
          ...
```
        ]
    },
    ...
  ]
}
```

In response to the post schema request, a post schema response would be issued. The post schema response includes a hash with information associated with the generated database entity object. For example, {"guid": "b00759de-1513468-4f23490-9223480-eab2344fbbc765e"}.

Once the dynamic database entity object has been created, the schema of the database associated with the user can be updated using the put schema request. The put schema request includes a schema token parameter that represents the database entity object within the centralized system and a database schema parameter which is a hash representation of the database structure. An example of a hash representation of the database structure may include:

```
{
  "database_schema": [
    {
      "table_name": "leads",
      "columns":
        [
          {"name": "id", "type": "integer"},
          ...
        ]
    },
    ...
  ]
}
```

In response to the put schema request, a put schema response may be issued. The response may be in the form of a blank body with a 200 status code.

In one embodiment, a user or administrator, via the API can update the columns of the database and database entity object. For example, using a post column request, a single column can be updated; put column request, columns may be added to the database; and using a delete column request, columns may be deleted.

System Overview

Figure 5:
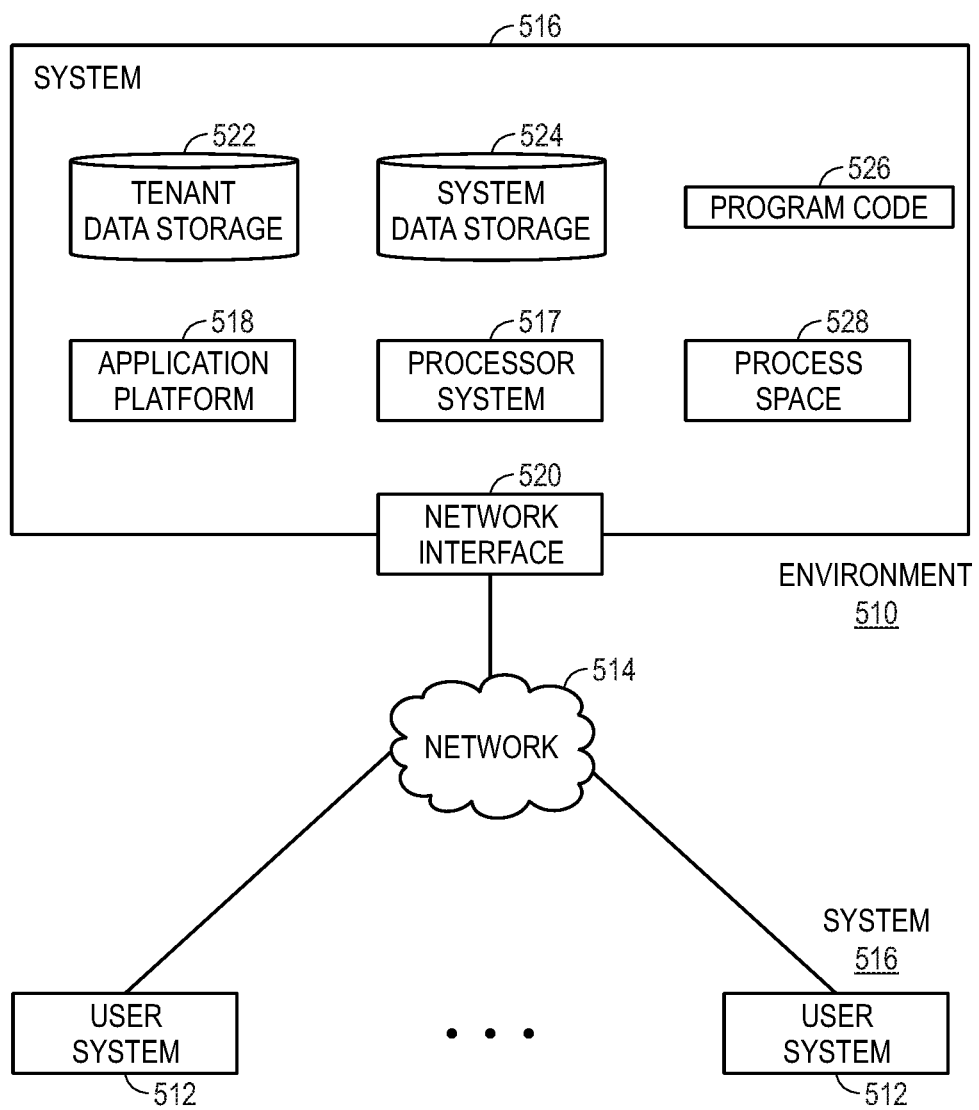
FIG. 5 illustrates a block diagram of an environment wherein an on-demand database service, in one embodiment.

FIG. 5 illustrates a block diagram of an environment 510 wherein an on-demand database service might be used. The environment 510 may include user systems 512, a network 514, a system 516, a processor system 517, an application platform 518, a network interface 520, a tenant data storage 522, a system data storage 524, program code 526, and a process space 528. In other embodiments, the environment 510 may not have all of the components listed and/or may have other elements instead of, or in addition to, those listed above.

The environment 510 is an environment in which an on-demand database service exists. A user system 512 may be any machine or system that is used by a user to access a database user system. For example, any of the user systems 512 may be a handheld computing device, a mobile phone, a laptop computer, a work station, and/or a network of computing devices. As illustrated in FIG. 5 (and in more detail in FIG. 5) the user systems 512 might interact via the network 514 with an on-demand database service, which is the system 516.

An on-demand database service, such as the system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 516" and the "system 516" will be used interchangeably herein. However, it should be understood that similar techniques may also be used in a single-tenant architecture. A database image may include one or more database objects. A relational database management system (RDMS) or the equivalent may execute storage and retrieval of information against the database object(s). The application platform 518 may be a framework that allows the applications of the system 516 to run, such as the hardware and/or software, e.g., the operating system. In an embodiment, the on-demand database service 516 may include the application platform 518 which enables creation, managing and executing one or more applications developed by the provider of the on-demand database service, users accessing the on-demand database service via user systems 512, or third party application developers accessing the on-demand database service via the user systems 512.

The users of the user systems 512 may differ in their respective capacities, and the capacity of a particular user system 512 might be entirely determined by permissions (permission levels) for the current user. For example, where a salesperson is using a particular user system 512 to interact with the system 516, that user system 512 has the capacities allotted to that salesperson. However, while an administrator is using that user system 512 to interact with the system 516, that user system 512 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 514 is any network or combination of networks of devices that communicate with one another. For example, the network 514 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 512 might communicate with the system 516 using TCP/IP and, at a higher network level, use other common Internet protocols to communicate, such as HTTP, FTP, AFS, WAP, etc. In an example where HTTP is used, the user systems 512 might include an HTTP client commonly referred to as a "browser" for sending and receiving HTTP messages to and from an HTTP server at the system 516. Such an HTTP server might be implemented as the sole network interface between the system 516 and the network 514, but other techniques might be used as well or instead. In some implementations, the interface between the system 516 and the network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 516, shown in FIG. 5, implements a web-based customer relationship management (CRM) system. For example, in one embodiment, the system 516 includes application servers configured to implement and execute CRM software applications as well as provide related data, code, forms, webpages and other information to and from the user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. Correspondingly, with a single-tenant or multi-instance system, data from multiple tenants is stored in separate respective database objects such that data from different tenants is never co-mingled. In certain embodiments, the system 516 implements applications other than, or in addition to, a CRM application. For example, the system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of the system 516 is shown in FIG. 5, including the network interface 520, the application platform 518, the tenant data storage 522 for tenant data 523, the system data storage 524 for system data 525 accessible to the system 516 and possibly multiple tenants, the program code 526 for implementing various functions of the system 516, and the process space 528 for executing MTS system processes and tenant-specific processes, such as running applications as part of an application hosting service. Additional processes that may execute on the system 516 include database indexing processes.

Several elements in the system shown in FIG. 5 include conventional, well-known elements that are explained only briefly here. For example, each of the user systems 512 could include a desktop personal computer, workstation, laptop, PDA, cell phone, or any wireless access protocol (WAP) enabled device or any other computing device capable of interfacing directly or indirectly to the Internet or other network connection. Each of the user systems 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant or single-tenant database system) of the user systems 512 to access, process and view information, pages and applications available to it from the system 516 over the network 514. Each of the user systems 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 516 or other systems or servers. For example, the user interface device may be used to access data and applications hosted by the system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 512 and all of its components are operator configurable using applications, such as a browser, including computer code run using a central processing unit such as an Intel Pentium® processor or the like. Similarly, the system 516 (and additional instances of an MTS, where more than one is present) and all of their components might be operator configurable using application(s) including computer code to run using a central processing unit such as the processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 516 is configured to provide webpages, forms, applications, data and media content to the user (client) systems 512 to support the access by the user systems 512 as tenants of the system 516. As such, the system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
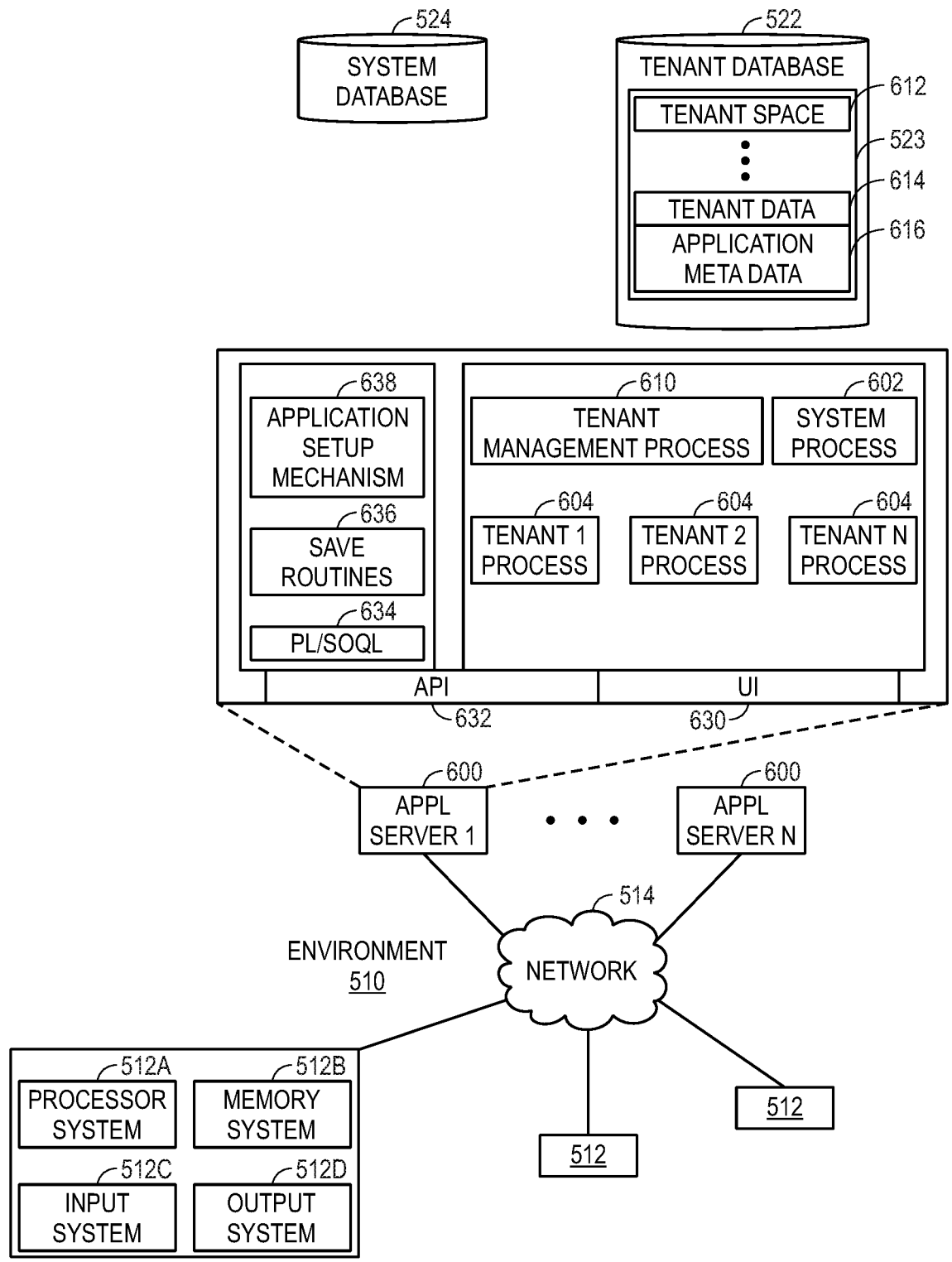
FIG. 6 illustrates a block diagram of an environment wherein an on-demand database service, in one embodiment.

FIG. 6 also illustrates the environment 510. However, in FIG. 6 elements of the system 516 and various interconnections in an embodiment are further illustrated. FIG. 6 shows that the each of the user systems 512 may include a processor system 512A, a memory system 512B, an input system 512C, and an output system 512D. FIG. 6 shows the network 514 and the system 516. FIG. 6 also shows that the system 516 may include the tenant data storage 522, the tenant data 523, the system data storage 524, the system data 526, a User Interface (UI) 630, an Application Program Interface (API) 632, a PL/SOQL 635, save routines 636, an application setup mechanism 638, applications servers $600_1$-$600_N$, a system process space 602, tenant process spaces 605, a tenant management process space 610, a tenant storage area 612, a user storage 614, and application metadata 616. In other embodiments, the environment 510 may not have the same elements as those listed above and/or may have other elements instead of, or in addition to, those listed above.

The user systems 512, the network 514, the system 516, the tenant data storage 522, and the system data storage 524 were discussed above in reference to FIG. 5. Regarding the user systems 512, the processor system 512A may be any combination of one or more processors. The memory system 512B may be any combination of one or more memory devices, short term, and/or long term memory. The input system 512C may be any combination of input devices, such as one or more keyboards, mice, trackballs, scanners, cameras, and/or interfaces to networks. The output system 512D may be any combination of output devices, such as one or more monitors, printers, and/or interfaces to networks. As shown by FIG. 6, the system 516 may include the network interface 520 (of FIG. 5) implemented as a set of HTTP application servers 600, the application platform 518, the tenant data storage 522, and the system data storage 524. Also shown is the system process space 602, including individual tenant process spaces 604 and the tenant management process space 610. Each application server 600 may be configured to access tenant data storage 522 and the tenant data 523 therein, and the system data storage 524 and the system data 526 therein to serve requests of the user systems 512. The tenant data 523 might be divided into individual tenant storage areas 612, which can be either a physical arrangement and/or a logical arrangement of data. Alternatively, the tenant data 523 may include data for a single tenant. Within each tenant storage area 612, the user storage 614 and the application metadata 616 might be similarly allocated for each user. For example, a copy of a user's most recently used (MRU) items might be stored to the user storage 614. Similarly, a copy of MRU items for an entire organization that is a tenant might be stored to the tenant storage area 612. The UI 630 provides a user interface and the API 632 provides an application programmer interface to the system 516 resident processes to users and/or developers at the user systems 512. The tenant data and the system data may be stored in various databases, such as one or more Oracle™ databases.

The application platform 518 includes the application setup mechanism 638 that supports application developers' creation and management of applications, which may be saved as metadata into the tenant data storage 522 by the save routines 636 for execution by subscribers as one or more tenant process spaces 604 managed by the tenant management process 610 for example. Invocations to such applications may be coded using the PL/SOQL 634 that provides a programming language style interface extension to the API 632. Invocations to applications may be detected by one or more system processes, which manages retrieving the application metadata 616 for the subscriber making the invocation and executing the metadata as an application in a virtual machine.

Each application server 600 may be communicably coupled to database systems, e.g., having access to the system data 525 and the tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F6 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, the system 516 is multi-tenant, wherein the system 516 handles storage of, and access to, different objects, data and applications across disparate users and organizations. However, as described in more detail below, the disclosed techniques may also be utilized in a single-tenant architecture.

In certain embodiments, the user systems 512 (which may be client systems) communicate with the application servers 600 to request and update system-level and tenant-level data from the system 516 that may require sending one or more queries to the tenant data storage 522 and/or the system data storage 524. The system 516 (e.g., an application server 600 in the system 516) automatically generates one or more SQL statements (e.g., one or more SQL queries) that are designed to access the desired information. The system data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants, whereas in single-tenant systems, entity tables may be provided for use by a single tenant. For CRM database applications, such standard entities might include tables for Account, Contact, Lead, and Opportunity data, each containing pre-defined fields. It should be understood that the word "entity" may also be used interchangeably herein with "object" and "table".

Figure 7:
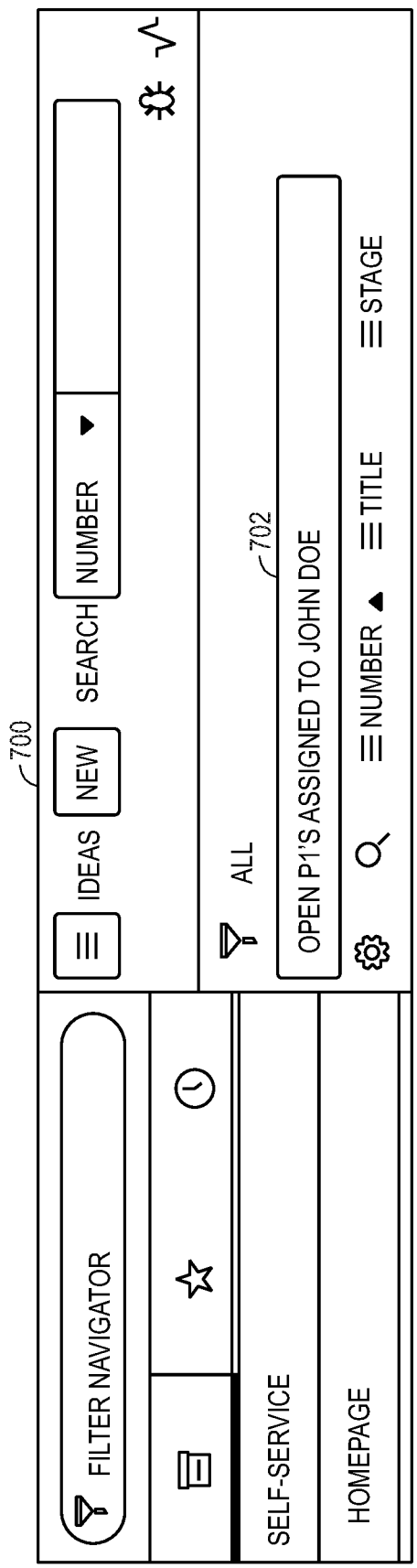
FIG. 7 illustrates an example user interface by which the natural language query is provided.

FIG. 7 illustrates window 700 of a GUI by which a user provides a natural language query. As shown, the window 700 includes a natural language query field 702 in which a user may type a natural language query. In the example illustrated in FIG. 7, the user has typed the text "open p1's assigned to john doe", indicating that the user is interested in seeing the instances of a certain type of project of task (e.g., p1) assigned to a person named John Doe. Accordingly, as described above with regard to FIGS. 3 and 4, the system may receive the natural language query provided via the natural language query field 702, translate the natural language query to a query language, and then either return the translated query to the user, or executed the translated query on a database and return the results to the user via the GUI.

Figure 8:
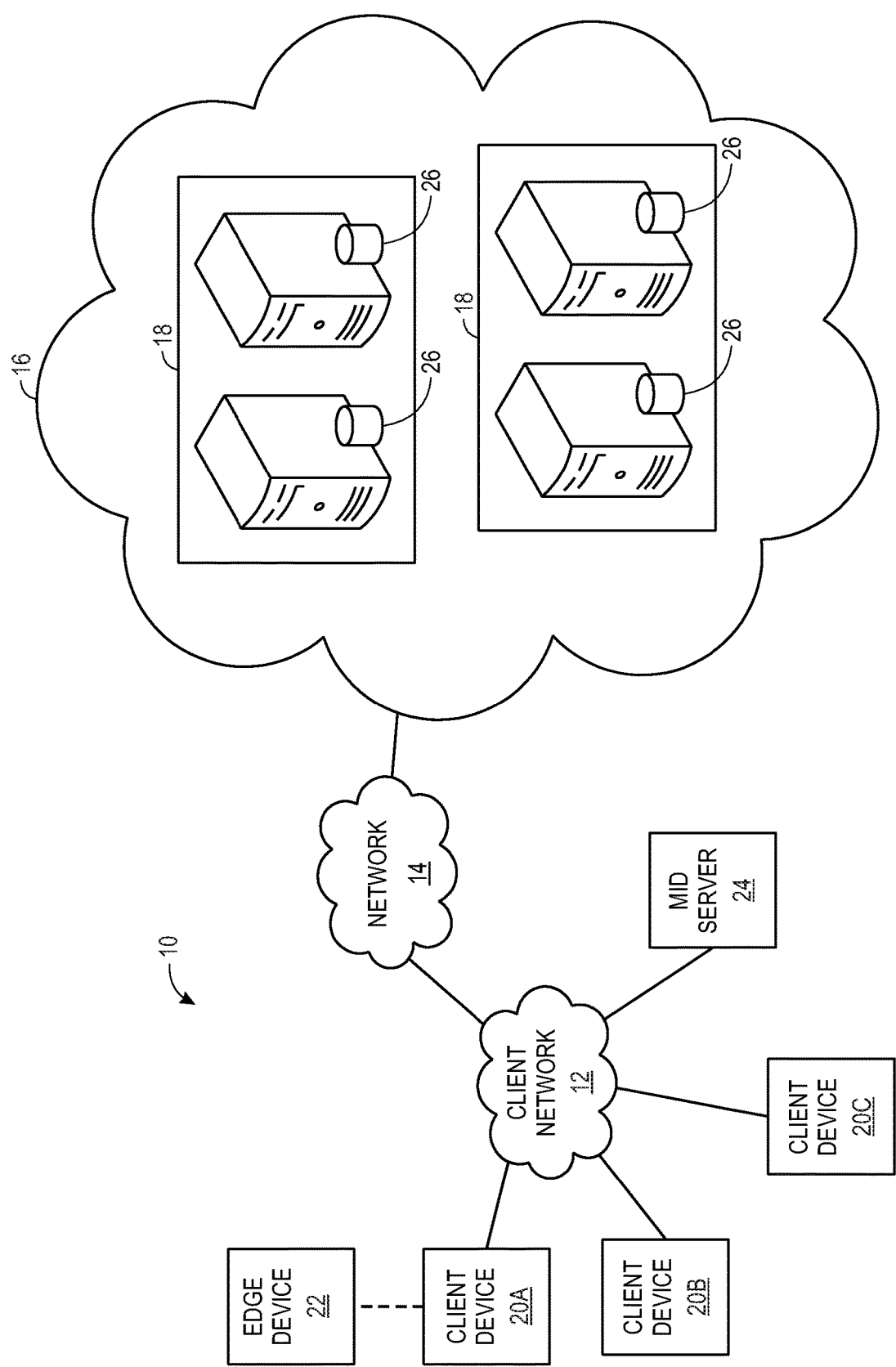
FIG. 8 is a block diagram of an embodiment of a cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning to FIG. 8, a schematic diagram of an embodiment of a computing system 800, such as a cloud computing system, where embodiments of the present disclosure may operate, is illustrated. The computing system 800 may include a client network 802, a network 804 (e.g., the Internet), and a cloud-based platform 806. In some implementations, the cloud-based platform 806 may be a configuration management database (CMDB) platform. In one embodiment, the client network 802 may be a local private network, such as local area network (LAN) having a variety of network devices that include, but are not limited to, switches, servers, and routers. In another embodiment, the client network 802 represents an enterprise network that could include one or more LANs, virtual networks, data centers 808, and/or other remote networks. As shown in FIG. 8, the client network 802 is able to connect to one or more client devices 810A, 810B, and 810C so that the client devices are able to communicate with each other and/or with the network hosting the platform 806. The client devices 810 may be computing systems and/or other types of computing devices generally referred to as Internet of Things (IoT) devices that access cloud computing services, for example, via a web browser application or via an edge device 812 that may act as a gateway between the client devices 810 and the platform 806. FIG. 8 also illustrates that the client network 802 includes an administration or managerial device or server, such as a management, instrumentation, and discovery (MID) server 814 that facilitates communication of data between the network hosting the platform 806, other external applications, data sources, and services, and the client network 802. Although not specifically illustrated in FIG. 8, the client network 802 may also include a connecting network device (e.g., a gateway or router) or a combination of devices that implement a customer firewall or intrusion protection system.

For the illustrated embodiment, FIG. 8 illustrates that client network 802 is coupled to a network 804. The network 804 may include one or more computing networks, such as other LANs, wide area networks (WAN), the Internet, and/or other remote networks, to transfer data between the client devices 810 and the network hosting the platform 806. Each of the computing networks within network 804 may contain wired and/or wireless programmable devices that operate in the electrical and/or optical domain. For example, network 804 may include wireless networks, such as cellular networks (e.g., Global System for Mobile Communications (GSM) based cellular network), IEEE 802.11 networks, and/or other suitable radio-based networks. The network 804 may also employ any number of network communication protocols, such as Transmission Control Protocol (TCP) and Internet Protocol (IP). Although not explicitly shown in FIG. 8, network 804 may include a variety of network devices, such as servers, routers, network switches, and/or other network hardware devices configured to transport data over the network 804.

In FIG. 8, the network hosting the platform 806 may be a remote network (e.g., a cloud network) that is able to communicate with the client devices 810 via the client network 802 and network 804. The network hosting the platform 806 provides additional computing resources to the client devices 810 and/or the client network 802. For example, by utilizing the network hosting the platform 806, users of the client devices 810 are able to build and execute applications for various enterprise, IT, and/or other organization-related functions. In one embodiment, the network hosting the platform 806 is implemented on the one or more data centers 808, where each data center could correspond to a different geographic location. Each of the data centers 808 includes a plurality of virtual servers 816 (also referred to herein as application nodes, application servers, virtual server instances, application instances, or application server instances), where each virtual server 816 can be implemented on a physical computing system, such as a single electronic computing device (e.g., a single physical hardware server) or across multiple-computing devices (e.g., multiple physical hardware servers). Examples of virtual servers 816 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 806, network operators may choose to configure the data centers 808 using a variety of computing infrastructures. In one embodiment, one or more of the data centers 808 are configured using a multi-tenant cloud architecture, such that one of the server instances 816 handles requests from and serves multiple customers. Data centers with multi-tenant cloud architecture commingle and store data from multiple customers, where multiple customer instances are assigned to one of the virtual servers 816. In a multi-tenant cloud architecture, the particular virtual server 816 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 816 causing outages for all customers allocated to the particular server instance.

In another embodiment, one or more of the data centers 808 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 816 and/or other combinations of physical and/or virtual servers 816, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 806, and customer-driven upgrade schedules. An example of implementing a customer instance within a multi-instance cloud architecture will be discussed in more detail below with reference to FIG. 9.

Figure 9:
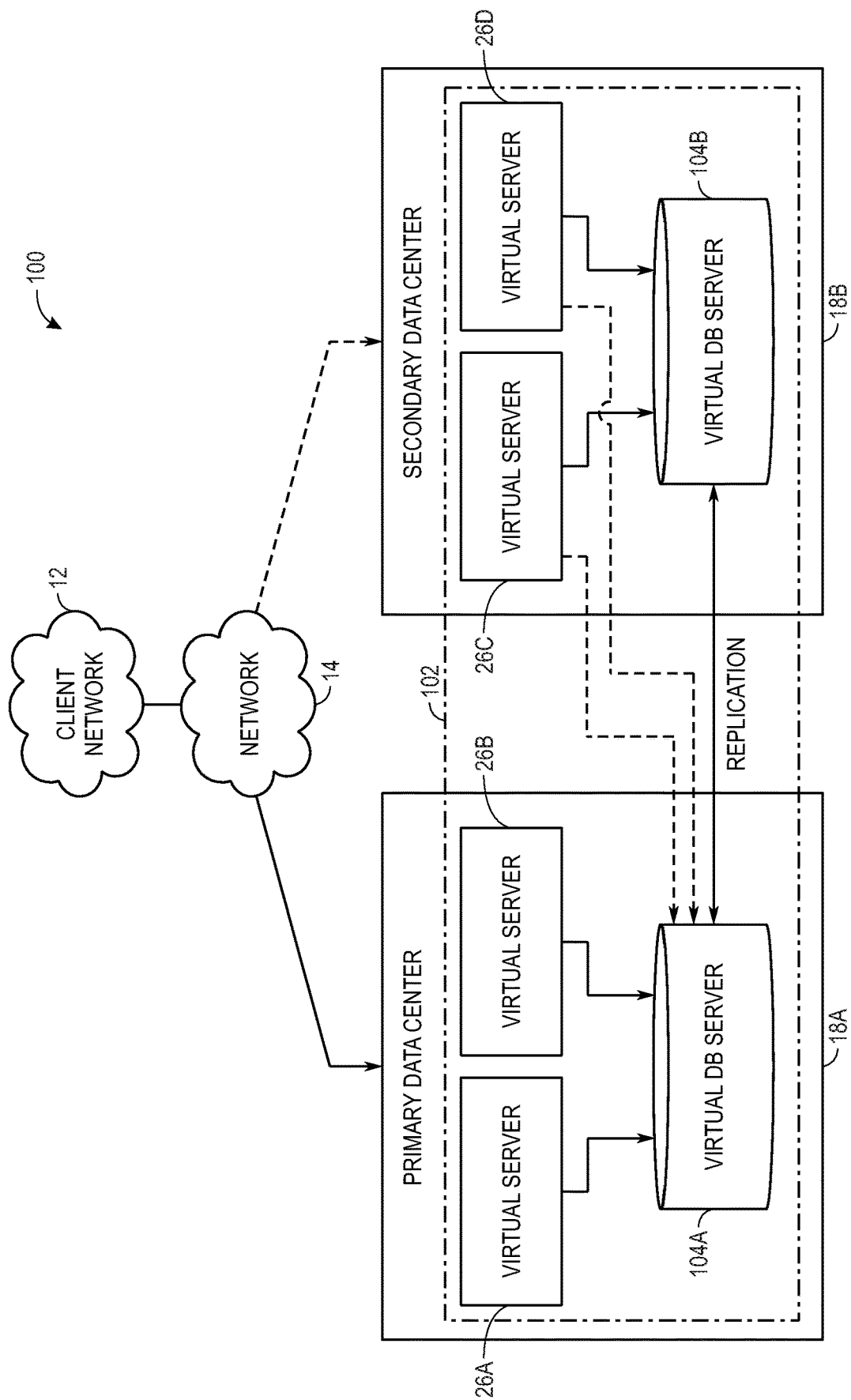
FIG. 9 is a schematic diagram of an embodiment of a multi-instance cloud architecture in which embodiments of the present disclosure may operate.

FIG. 9 is a schematic diagram of an embodiment of a multi-instance cloud architecture 900 where embodiments of the present disclosure may operate. FIG. 9 illustrates that the multi-instance cloud architecture 900 includes the client network 802 and the network 804 that connect to two (e.g., paired) data centers 808A and 808B that may be geographically separated from one another. Using FIG. 9 as an example, network environment and service provider cloud infrastructure client instance 902 (also referred to herein as a client instance 902) is associated with (e.g., supported and enabled by) dedicated virtual servers (e.g., virtual servers 816A, 816B, 816C, and 816D) and dedicated database servers (e.g., virtual database servers 904A and 904B). Stated another way, the virtual servers 816A-816D and virtual database servers 904A and 904B are not shared with other client instances and are specific to the respective client instance 902. In the depicted example, to facilitate availability of the client instance 902, the virtual servers 816A-816D and virtual database servers 904A and 904B are allocated to two different data centers 808A and 808B so that one of the data centers 808 acts as a backup data center. Other embodiments of the multi-instance cloud architecture 900 could include other types of dedicated virtual servers, such as a web server. For example, the client instance 902 could be associated with (e.g., supported and enabled by) the dedicated virtual servers 816A-816D, dedicated virtual database servers 904A and 904B, and additional dedicated virtual web servers (not shown in FIG. 9). Although FIGS. 8 and 9 illustrate specific embodiments of a cloud computing system 800 and a multi-instance cloud architecture 900, respectively, the disclosure is not limited to the specific embodiments illustrated in FIGS. 8 and 9. For instance, although FIG. 8 illustrates that the platform 806 is implemented using data centers, other embodiments of the platform 806 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 9 as an example, the virtual servers 816A, 816B, 816C, 816D and virtual database servers 904A, 904B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 8 and 9 are only examples to facilitate ease of description and explanation and are not intended to limit the disclosure to the specific examples illustrated therein.

As may be appreciated, the respective architectures and frameworks discussed with respect to FIGS. 8 and 9 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 10:
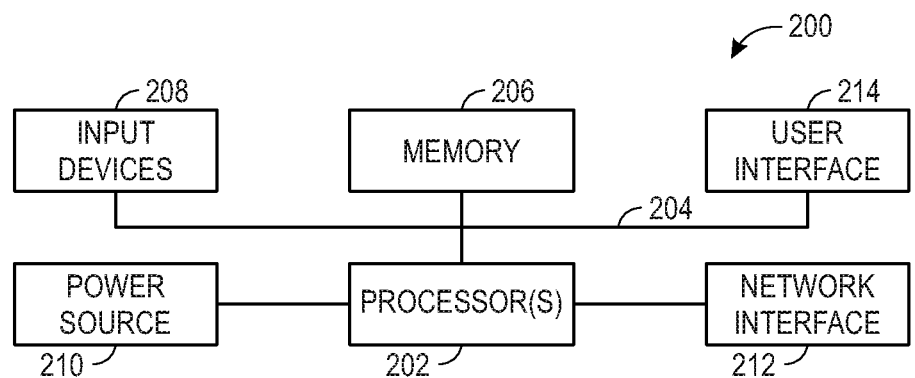
FIG. 10 is a block diagram of a computing device utilized in a computing system that may be present in FIG. 8 or 9, in accordance with aspects of the present disclosure.

With this in mind, and by way of background, it may be appreciated that the present approach may be implemented using one or more processor-based systems such as shown in FIG. 10. Likewise, applications and/or databases utilized in the present approach stored, employed, and/or maintained on such processor-based systems. As may be appreciated, such systems as shown in FIG. 10 may be present in a distributed computing environment, a networked environment, or other multi-computer platform or architecture. Likewise, systems such as that shown in FIG. 11, may be used in supporting or communicating with one or more virtual environments or computational instances on which the present approach may be implemented.

With this in mind, an example computer system may include some or all of the computer components depicted in FIG. 10. FIG. 10 generally illustrates a block diagram of example components of a computing system 1000 and their potential interconnections or communication paths, such as along one or more busses. As illustrated, the computing system 1000 may include various hardware components such as, but not limited to, one or more processors 1002, one or more busses 1004, memory 1006, input devices 1008, a power source 1010, a network interface 1012, a user interface 1014, and/or other computer components useful in performing the functions described herein.

The one or more processors 1002 may include one or more microprocessors capable of performing instructions stored in the memory 1006. Additionally or alternatively, the one or more processors 1002 may include application-specific integrated circuits (ASICs), field-programmable gate arrays (FPGAs), and/or other devices designed to perform some or all of the functions discussed herein without calling instructions from the memory 1006.

With respect to other components, the one or more busses 1004 includes suitable electrical channels to provide data and/or power between the various components of the computing system 1000. The memory 1006 may include any tangible, non-transitory, and computer-readable storage media. Although shown as a single block in FIG. 8, the memory 1006 can be implemented using multiple physical units of the same or different types in one or more physical locations. The input devices 1008 correspond to structures to input data and/or commands to the one or more processor 1002. For example, the input devices 1008 may include a mouse, touchpad, touchscreen, keyboard and the like. The power source 1010 can be any suitable source for power of the various components of the computing device 1000, such as line power and/or a battery source. The network interface 1012 includes one or more transceivers capable of communicating with other devices over one or more networks (e.g., a communication channel). The network interface 1012 may provide a wired network interface or a wireless network interface. A user interface 1014 may include a display that is configured to display text or images transferred to it from the one or more processors 1002. In addition and/or alternative to the display, the user interface 1014 may include other devices for interfacing with a user, such as lights (e.g., LEDs), speakers, and the like.

Figure 11:
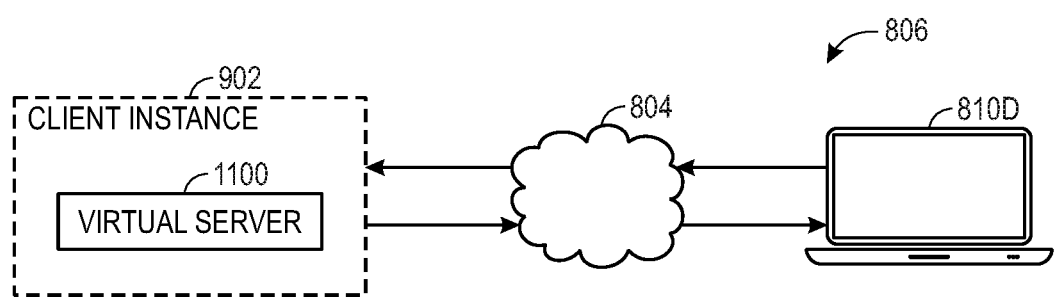
FIG. 11 is a block diagram illustrating an embodiment in which a virtual server supports and enables the client instance, in accordance with aspects of the present disclosure.

With the foregoing in mind, FIG. 11 is a block diagram illustrating an embodiment in which a virtual server 1100 supports and enables the client instance 902, according to one or more disclosed embodiments. More specifically, FIG. 11 illustrates an example of a portion of a service provider cloud infrastructure, including the cloud-based platform 806 discussed above. The cloud-based platform 806 is connected to a client device 810D via the network 804 to provide a user interface to network applications executing within the client instance 902 (e.g., via a web browser of the client device 810D). Client instance 902 is supported by virtual servers 816 similar to those explained with respect to FIG. 9, and is illustrated here to show support for the disclosed functionality described herein within the client instance 902. Cloud provider infrastructures are generally configured to support a plurality of end-user devices, such as client device 810D, concurrently, wherein each end-user device is in communication with the single client instance 902. Also, cloud provider infrastructures may be configured to support any number of client instances, such as client instance 902, concurrently, with each of the instances in communication with one or more end-user devices. As mentioned above, an end-user may also interface with client instance 902 using an application that is executed within a web browser.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a network interface;
a processor communicatively coupled to the network interface; and
a memory component, accessible by the processor, and storing instructions that, when executed by the processor, cause the processor to:
receive, via the network interface, from a user device, a natural language query for a first database, a key identifying a second database that includes a plurality of user records containing respective database query language types associated with respective databases of respective users, and a token identifying (1) a source of the natural language query and (2) one or more access privileges associated with the source of the natural language query to the second database;
query the second database to identify a particular user record of the plurality of user records associated with the source based on the token, wherein the particular user record includes a particular database query language type associated with the first database;
process a text input of the natural language query to generate a modified text input;
generate an entity tree based on the modified text input, wherein generating the entity tree comprises assigning one or more semantic markers to one or more words or one or more groups of words within the modified text input, wherein each semantic marker of the one or more semantic markers denotes a semantic class for each respective word of the one or more words or each group of words of the one or more groups of words;
convert the entity tree into a particular database query language associated with the first database to generate a database query based on the particular database query language type in the particular user record;
execute the database query of the first database; and
transmit, via the network interface, one or more results of the database query to the user device.

2. The system of claim 1, wherein the instructions cause the processor to output the database query, via the network interface, to the user device.

3. The system of claim 1, wherein communication with the user device is encrypted.

4. The system of claim 1, wherein the natural language query received from the user device comprises the text input.

5. The system of claim 1, wherein the natural language query received from the user device comprises a voice message, wherein the instructions cause the processor to convert the voice message into the text input.

6. The system of claim 1, wherein the instructions cause the processor to identify query elements in the modified text input and identify respective semantic classes for each respective word of the one or more words or each group of words of the one or more groups of words based on the one or more semantic markers and a set of grammar rules.

7. The system of claim 1, wherein the instructions cause the processor to:
generate an object representing the modified text input, wherein the object comprises one or more respective entities for each respective word of the one or more words or each group of words of the one or more groups of words of the modified text input.

8. The system of claim 7, wherein the instructions cause the processor to identify one or more relationships between the one or more respective entities in the object by applying a set of heuristic rules.

9. The system of claim 1, wherein the instructions cause the processor to select a single semantic marker of the one or more semantic markers assigned to each respective word of the one or more words or each group of words of the one or more groups of words.

10. The system of claim 1, wherein the system has a single-tenant architecture.

11. A method, comprising:
receiving, via a network interface, from a user device, a natural language query for a first database, a key identifying a second database that includes a plurality of user records comprising respective database query language types associated with respective databases of respective users, and a token identifying (1) a source of the natural language query and (2) one or more access privileges associated with the source of the natural language query to the second database;
querying the second database to identify a particular user record of the plurality of user records associated with the source based on the token, wherein the particular user record includes a particular database query language type associated with the first database;
pre-processing, via a processor, a text input of the natural language query to generate a modified text input;
generating an entity tree based on the modified text input, wherein generating the entity tree comprises assigning one or more semantic markers to one or more words or one or more groups of words within the modified text input, wherein each semantic marker of the one or more semantic markers denotes a semantic class for each respective word of the one or more words or each group of words of the one or more groups of words;
converting, via the processor, the entity tree into a particular database query language associated with the first database to generate a database query based on the particular database query language type in a particular user record;
executing the database query of the first database; and
transmitting, via the network interface, one or more results of the database query to the user device.

12. The method of claim 11, comprising outputting the database query, via the network interface, to the user device.

13. The method of claim 11, comprising:
identifying query elements in the modified text input;
identifying respective semantic classes for each respective word of the one or more words or each group of words of the one or more groups of words based on the one or more semantic markers and a set of grammar rules;
generating an object representing the modified text input, wherein the object comprises one or more respective entities for each respective word of the one or more words or each group of words of the one or more groups of words of the modified text input; and identifying one or more relationships between the one or more respective entities in the object by applying a set of heuristic rules.

14. A tangible, non-transitory, computer readable storage medium, comprising instructions that, when executed by a processor, cause the processor to:
receive, via a network interface, from a user device, a natural language query for a first database, a key identifying a second database that includes a plurality of user records containing respective database query language types associated with respective databases of respective users, and a token identifying (1) a source of the natural language query and (2) one or more access privileges associated with the source of the natural language query to the second database;
query the second database to identify a particular user record of the plurality of user records associated with the source based on the token, wherein the particular user record includes a particular database query language type associated with the first database;
process a text input of the natural language query to generate a modified text input;
generate an entity tree based on the modified text input, wherein generating the entity tree comprises assigning one or more semantic markers to one or more words or one or more groups of words within the modified text input, wherein each semantic marker of the one or more semantic markers denotes a semantic class for each respective word of the one or more words or each group of words of the one or more groups of words;
convert the entity tree into a particular database query language associated with the first database to generate a database query based on the particular database query language type in the particular user record;
execute the database query of the first database; and
transmit, via the network interface, one or more results of the database query to the user device.

15. The tangible, non-transitory, computer readable storage medium of claim 14, wherein the instructions cause the processor to output the database query, via the network interface, to the user device.

16. The tangible, non-transitory, computer readable storage medium of claim 14, wherein the instructions cause the processor to:
identify query elements in the modified text input; and
identify respective semantic classes for each respective word of the one or more words or each group of words of the one or more groups of words based on the one or more semantic markers and a set of grammar rules.

17. The tangible, non-transitory, computer readable storage medium of claim 14, wherein the instructions cause the processor to generate an object representing the modified text input, wherein the object comprises one or more respective entities for each respective word of the one or more words or each group of words of the one or more groups of words of the modified text input.

* * * * *